(No Model.)  A. H. OVERMAN.  3 Sheets—Sheet 1.
CYCLE.

No. 463,390.  Patented Nov. 17, 1891.

WITNESSES:
Chas. B. Shumway
E. H. Rogers

INVENTOR
Albert H. Overman
By Geo. O. Seymour
Atty.

(No Model.) 3 Sheets—Sheet 2.

A. H. OVERMAN.
CYCLE.

No. 463,390. Patented Nov. 17, 1891.

WITNESSES
INVENTOR (No Model.)  A. H. OVERMAN.  3 Sheets—Sheet 3.
CYCLE.

No. 463,390.  Patented Nov. 17, 1891.

WITNESSES:
Chas B. Shumway
E. H. Rogers

INVENTOR
Albert H. Overman
By Geo. D. Seymour
Atty.

UNITED STATES PATENT OFFICE.

ALBERT H. OVERMAN, OF NEWTON, ASSIGNOR TO THE OVERMAN WHEEL COMPANY, OF BOSTON, MASSACHUSETTS.

CYCLE.

SPECIFICATION forming part of Letters Patent No. 463,390, dated November 17, 1891.

Application filed December 13, 1886. Serial No. 221,368. (No model.)

*To all whom it may concern:*

Be it known that I, ALBERT H. OVERMAN, residing at Newton, in the county of Middlesex and State of Massachusetts, have invented certain new and useful Improvements in Cycles; and I do declare the following to be a full, clear, and exact description of the same, reference being had to the accompanying drawings, which form a part of this specification.

My invention relates to an improvement in cycles, the object being to absorb vibration in such vehicles, and thus increase their comfort and durability.

With these ends in view my invention consists in a spring-fork in combination with a stay connected with the wheel-axle and the vehicle-frame, one of such connections being flexible in the plane of the wheel.

My invention further consists in a bowed spring-fork in combination with a stay having two arms respectively located on opposite sides of the wheel and each connected with the axle thereof and the vehicle-frame, their connections at one end being flexible in the plane of the wheel.

My invention further consists in certain details of construction and combinations of parts, as will be hereinafter described, and pointed out in the claims.

Figure 1:
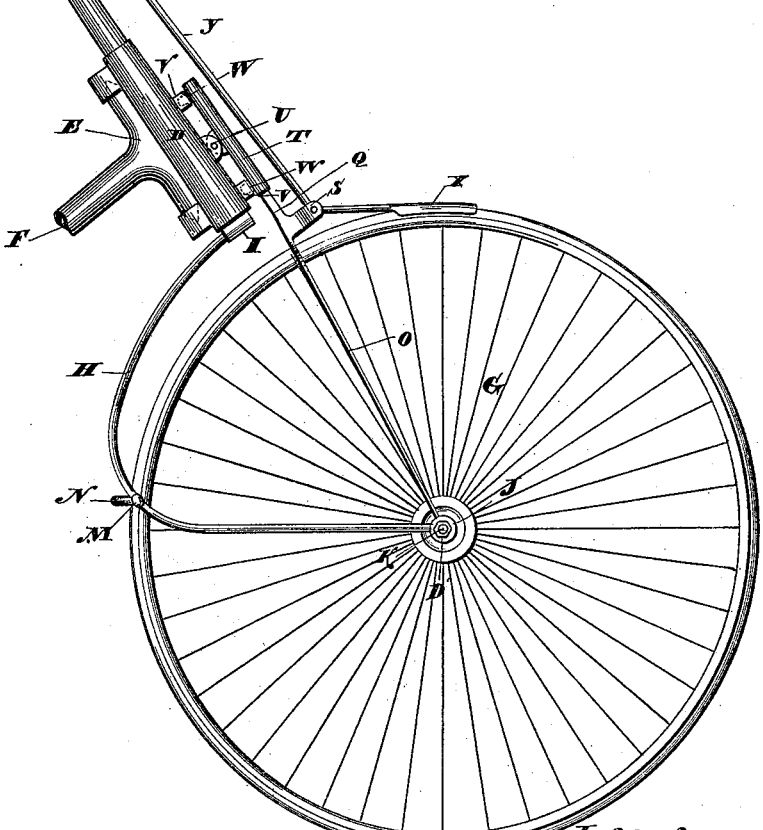
Figure 2:
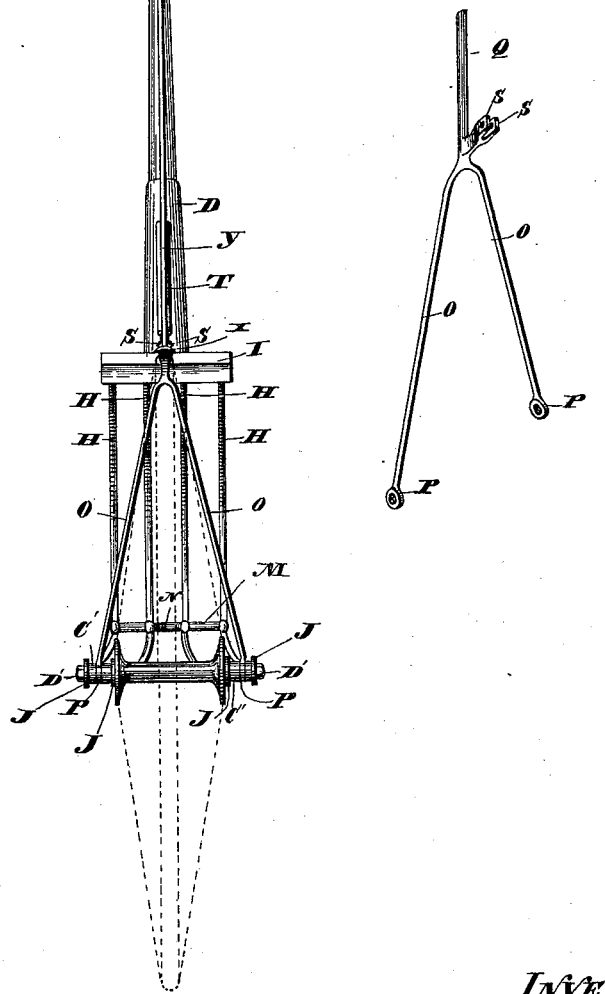
Figure 3:
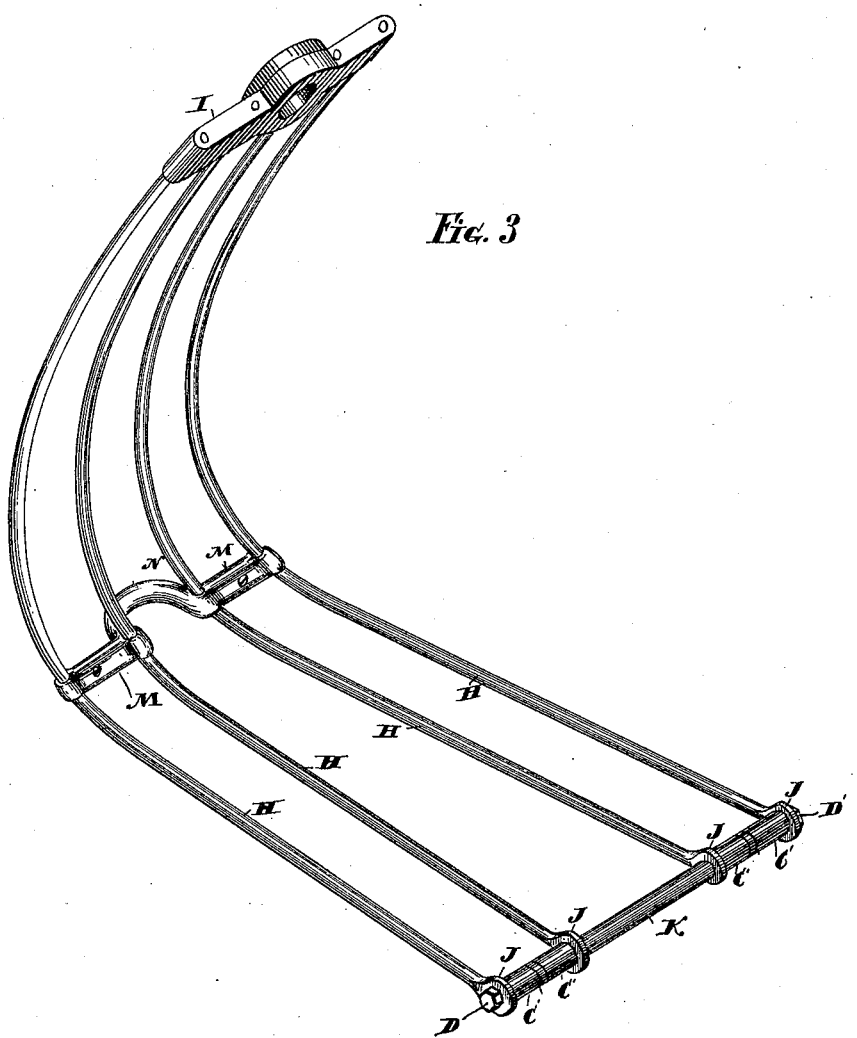

In the accompanying drawings, Figure 1 is a view in side elevation of the steering part of a tricycle embodying my invention. Fig. 2 is a view thereof in front elevation, with the wheel in broken lines. Fig. 3 is a detached perspective view of the bowed spring-fork, and Fig. 4 is a similar view of the stay.

The steering-rod A, handle-bar B, handles C C, steering-head D, spindle E, spine F, and wheel G are of ordinary construction. The bowed spring-fork consists, as herein shown, of four heavy bowed rods H H H H, secured at their upper ends to a cross-head I, adapted to be rigidly attached to the lower end of the steering-rod and provided at their lower ends with eyes J, adapting them to be slipped over the extended ends K of the axle L of the vehicle. About midway the length of the rods they are tied together by a brace M of any suitable construction and curved outward at N to receive the edge of the wheel, which runs between the inner rods, the same being slightly spread apart for the purpose; but this brace is not essential. The respective rods are placed side by side in the same horizontal plane and those on opposite sides of the wheel are nearly parallel. There is, however, a gradual divergence in the rods from their upper to their lower ends, so that the fork as a structure is tapering and widens from the point of its attachment to the steering-rod to its connection with the axle. The rods are bowed to bring the steering-head in line with the axle, and so that, beginning at their upper ends, they will follow the rim of the wheel and then, bending, extend forward on a horizontal line, passing through the axle of the same.

The stay consists, as herein shown, of two arms O O, provided at their lower ends with eyes P P, adapting them for connection with the extended ends K of the axle and merging at their upper ends into a shank Q, having lugs S S upon its outer face and playing in a sleeve T, pivoted to the steering-head, as at U, so as to rock in a vertical plane to the exclusion of any lateral movement, the lateral strain upon the pivot U being relieved by the interlocking hubs V V and spurs W W, as shown. Under the described construction the stay-arms are flexibly connected, as it were, to the vehicle-frame in so far as vertical movement or movement in the plane of the wheel is concerned.

The brake X and the tube Y, which are rigidly connected together, are pivoted in the lugs S S aforesaid, the upper end of the tube receiving a rod Z, connected at its upper end with the hand-piece A', which is pivoted to the handle-bar B and held in position for the application of the brake by a rubber band B', encircling it and such bar.

Washers C', located upon the ends K of the axle, are interposed between the eyes of the rods and arms and preserve the relations of the same, the eyes and washers being tied together by nuts D', screwed onto the said ends of the axle.

The stay accommodates all vertical action between the upper and lower ends of the fork by the playing of its shank in the pivoted or rocking sleeve; but as to lateral action it forms a rigid connection between the frame of the vehicle and the wheel. Therefore, without in any way interfering with or abating the cushioning effect of the bowed spring-fork, the stay stiffens and re-enforces the connection between the vehicle-frame and the wheel and assists the braced fork in resisting lateral strain. The stay has also a very important function in its carriage of the brake, which it preserves in line with the rim of the wheel under any conditions of strain to which the cycle may be exposed.

As herein shown, the invention is applied to a bicycle-steering tricycle. It is not, however, limited to such use, but may be utilized in bicycles of the Safety type, and, in fact, in all cycle constructions where available. The fork and stay are not limited to the steering-wheel of a cycle, but both may be applied to the other wheels of such vehicles.

If desired, more than four rods may be employed in the fork, and their bow or curve and relative arrangement may be modified as becomes expedient. Thus the outer rods might be curved or sharply slanted inward at their lower ends to meet a shorter axle. The stay may also be modified under obvious ways of securing accommodation to vertical action and resistance to lateral deflection. I would therefore have it understood that I do not limit myself to the exact construction and arrangement of parts herein shown and described, but hold myself at liberty to make such changes and alterations as fairly fall within the spirit and scope of my invention.

Having fully described my invention, what I claim as new, and desire to secure by Letters Patent, is—

1. In a cycle, the combination, with a bowed spring-fork, of a pivotal stay connecting the vehicle-frame and a wheel-axle and resisting lateral deflection of the fork, but accommodating vertical action therein, substantially as set forth.

2. In a cycle, the combination, with a bowed spring-fork connected with the vehicle-frame and a wheel-axle, of a stay connected at its lower end with the wheel-axle and pivotally connected at its upper end with the vehicle-frame, substantially as set forth.

3. In a cycle, the combination, with a bowed spring-fork connected with a wheel-axle and a vehicle-frame, of two stay-arms respectively located on opposite sides of the wheel and each connected at one end with the wheel-axle and pivotally connected at the other end with the vehicle-frame, substantially as set forth.

4. In a cycle, a spring-fork composed of spring-rods provided at their lower ends with eyes adapting them to be slipped over extensions of a wheel-axle, in combination with a stay having eyes for connection with such axle, the eyes of the rods and arms being tied together by nuts applied to the ends of the axle, substantially as set forth.

5. In a cycle, a stay connecting the frame of the vehicle with the axle of a wheel and accommodating vertical but resisting lateral action, and a brake carried by such stay, substantially as set forth.

6. In a cycle, a bowed spring-fork, a stay accommodating vertical action, but resisting lateral deflection, and a brake carried by such stay, substantially as set forth.

7. In a cycle, the combination, with a spring-fork, of a fork-stay connected to the wheel-axle and to the wheel-frame, one of such connections being flexible in the plane of the wheel.

8. In a cycle, the combination, with a bowed spring-fork composed of four bowed springs having their upper ends connected with the lower end of the steering-rod of the machine and their lower ends connected with extensions of the axle of the steering-wheel thereof, the two inner springs being separated to form a space for the wheel to run in, of a stay having two arms respectively located on opposite sides of the wheel and having their lower ends connected with the wheel-axle and their upper ends connected with the vehicle-frame, the said latter connections being flexible in the plane of the wheel, substantially as set forth.

In testimony whereof I have signed this specification in the presence of two subscribing witnesses.

ALBERT H. OVERMAN.

Witnesses:
GEORGE D. SEYMOUR,
CHAS. B. SHUMWAY.